(No Model.)
J. HAISH.
BARBED FENCE WIRE.
No. 261,704. Patented July 25, 1882.
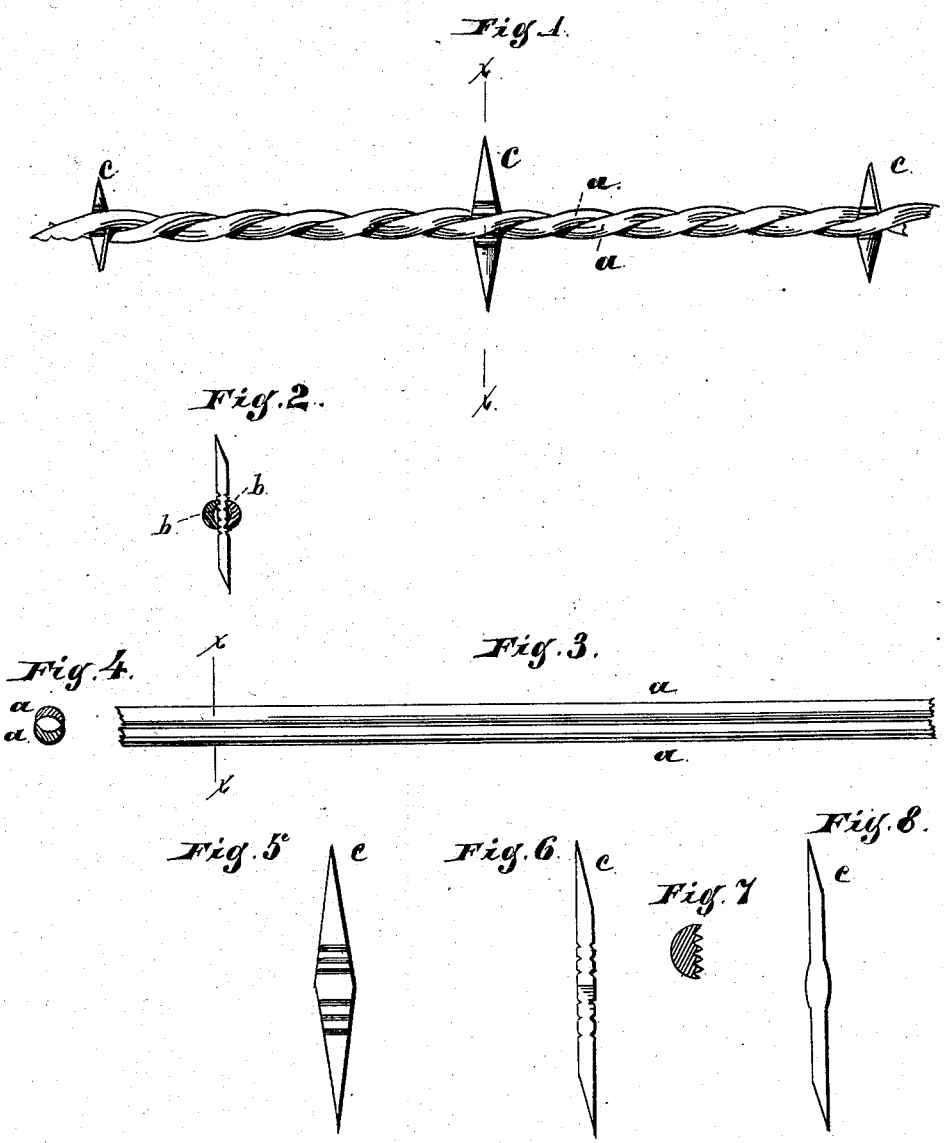

UNITED STATES PATENT OFFICE.

JACOB HAISH, OF DE KALB, ILLINOIS.

BARBED FENCE-WIRE.

SPECIFICATION forming part of Letters Patent No. 261,704, dated July 25, 1882.

Application filed April 24, 1882. (No model.)

*To all whom it may concern:*

Be it known that I, JACOB HAISH, residing at De Kalb, in the county of De Kalb and State of Illinois, and a citizen of the United States, have invented a new and useful Improvement in Barbed Fence-Wire, of which the following is a full description, reference being had to the accompanying drawings, in which—

Figure 1 is a side elevation. Fig. 2 is a cross-section at line $x$ of Fig. 1, the barb being in elevation; Fig. 3, a side view of the two main wires before they are twisted; Fig. 4, a section at line $x$ of Fig. 3; Figs. 5 and 6, enlarged views of a barb; Fig. 7, a modification of the main wires; Fig. 8, a modification of the barb.

This invention relates to that class of barbed fence-wire in which the barbs are placed between and held in place by two twisted wires. Its object is to provide efficient means for securely holding straight barbs in place between and by means of two twisted wires, and this I accomplish by providing each of the two wires which form the main wire with a longitudinal groove; by providing the straight barbs with uneven surfaces by means of slight transverse indentations or by slightly enlarging the same at the center, and by twisting the two main wires around each other and around the barbs in such manner that the edges of the grooves in the main wires will engage with the indentations in the barbs or with the enlargement thereon, as hereinafter fully described.

In the drawings, $a\ a$ represent two single wires, each of which is provided with a continuous longitudinal groove, $b$.

$c$ are straight barbs, which may be made from narrow flat strips of metal of suitable thickness. Each barb $c$ is provided with any suitable number of transverse indentations, $d$, on two opposite sides and a little at each side of the center. These indentations can be made by a suitable machine before the barbs are cut, and, as they are not deep, they will not materially affect the strength of the barb.

The two wires $a\ a$ are to be twisted together and the barbs are to be inserted between the wires at suitable intervals as the wires are being twisted. The wires are to be so arranged that the grooves $b$ will be opposite to each other, and the sharp edges upon the sides of the grooves $b$, or some of them, will enter the indentations $d$ in the barbs, and they will be securely held in place and cannot escape. It will be necessary to twist the wires tightly; but it is desirable to do this without reference to the feature of holding the barbs in place. I am thus able to provide a barbed fence-wire the barbs of which require the smallest possible quantity of metal, which can be made with little labor and with inexpensive machinery, and which will be held in place securely by the twisted wires.

The barbs might be made from oval wire or from round wire, provided with suitable indentations to engage with the edges of the grooves in the main wires.

My improved barbed fence-wire will be manufactured by machinery, and, if desired, the machine can be so constructed that pressure will be applied to the two main wires at or near to the edges of the barbs, which will clamp the main wires somewhat more closely on the barbs.

Instead of providing each main wire with a single groove, as above described, these main wires might be provided with a flattened serrated surface, as shown in Fig. 7, in which case the serrations, or some of them, would engage with some of the indentations in the barb, producing the effect before described.

The principle of my invention could be applied by providing the barbs with a slight enlargement at the center, as shown in Fig. 8, adapted to enter the grooves $b$ in the two wires $a\ a$, in which case the enlargement will form an uneven surface on the barb, and the result will be the same as that produced by the indentations $d$.

Heretofore barbed fence-wire has been composed of double-pointed barbs, each having an intermediate enlarged body portion provided with opposite transverse channels clasped between the spring bows or bends of the twisted wires; and barbed fence-wire has also been composed of flat two-pointed barbs inserted between the twisted strands of wire, and each barb provided with a slight bend to form a shoulder near its middle to hold the same rigid.

Such constructions of barbed fence-wire, however, do not constitute my invention, and are not herein claimed.

What I claim as new, and desire to secure by Letters Patent, is as follows:

A barbed wire for fences, consisting of two single wires, each provided with a longitudinal groove, and straight metal barbs provided with uneven surfaces, the two wires being twisted upon each other and around the barbs, which are held in place between the two wires by such twisting and by the grooves in the wires and the uneven surfaces of the barbs, substantially as specified.

JACOB HAISH.

Witnesses:
E. A. WEST,
ALBERT H. ADAMS.